United States Patent [19]

Young

[11] 4,319,644
[45] Mar. 16, 1982

[54] ROW OPENING AND ROW CLOSING TOOL

[76] Inventor: Leroy Young, 502 Main St., Franklinton, La. 70438

[21] Appl. No.: 99,475

[22] Filed: Dec. 3, 1979

[51] Int. Cl.³ .............................................. A01B 1/20
[52] U.S. Cl. .................................................. 172/375
[58] Field of Search ............... 172/375, 380, 381, 136; D8/11, 6

[56] References Cited

U.S. PATENT DOCUMENTS

| | | | |
|---|---|---|---|
| 1,037,870 | 9/1912 | Cone | 172/375 |
| 2,268,252 | 12/1941 | Helmers | 172/375 X |
| 2,400,241 | 5/1946 | Linden | 172/375 |
| 2,548,012 | 4/1951 | Frost | 172/375 X |
| 3,965,990 | 6/1975 | Pittman | 172/375 |
| 4,011,612 | 3/1977 | Atkinson | 172/375 X |

*Primary Examiner*—Richard T. Stouffer
*Attorney, Agent, or Firm*—David L. Ray

[57] ABSTRACT

A hand-held garden implement having a central plate with a tapered digging blade depending therefrom, a rake handle connected to the central plate, two raking blades connected to the central plate turned backwardly toward the rake handle, and a covering blade connected to the central plate which trails the raking blades.

3 Claims, 4 Drawing Figures

ROW OPENING AND ROW CLOSING TOOL

BACKGROUND OF THE INVENTION

The present invention generally pertains to garden implements and, more particularly, to hand-held garden implements designed to do a plurality of garden chores.

Hand-held garden implements designed to do a plurality of chores are well-known in the art. For examples see U.S. Pat. Nos. 4,011,612; 3,965,990; 2,548,012; 2,268,252; and, 1,037,870.

Other hand-held instruments known in the art are hoes, rakes, small hand-held plows and other digging implements. In the past a gardener, in order to dig a trench in which seeds are to be planted and to cover the trench, had to use a variety of garden tools or he had to do the job by hand. To use a variety of garden tools is more expensive than employing one tool and to do the job by hand is costly in time and labor.

SUMMARY OF THE INVENTION

In accordance with the present invention there is provided a hand-held garden implement having a central plate with a tapered digging blade depending therefrom, a rake handle connected to the central plate, two raking blades connected to the central plate turned backwardly toward the rake handle, and a covering blade connected to the central plate which trails the raking blades.

DESCRIPTION OF THE PREFERRED EMBODIMENTS

Figures 1, 2, 3, 4:
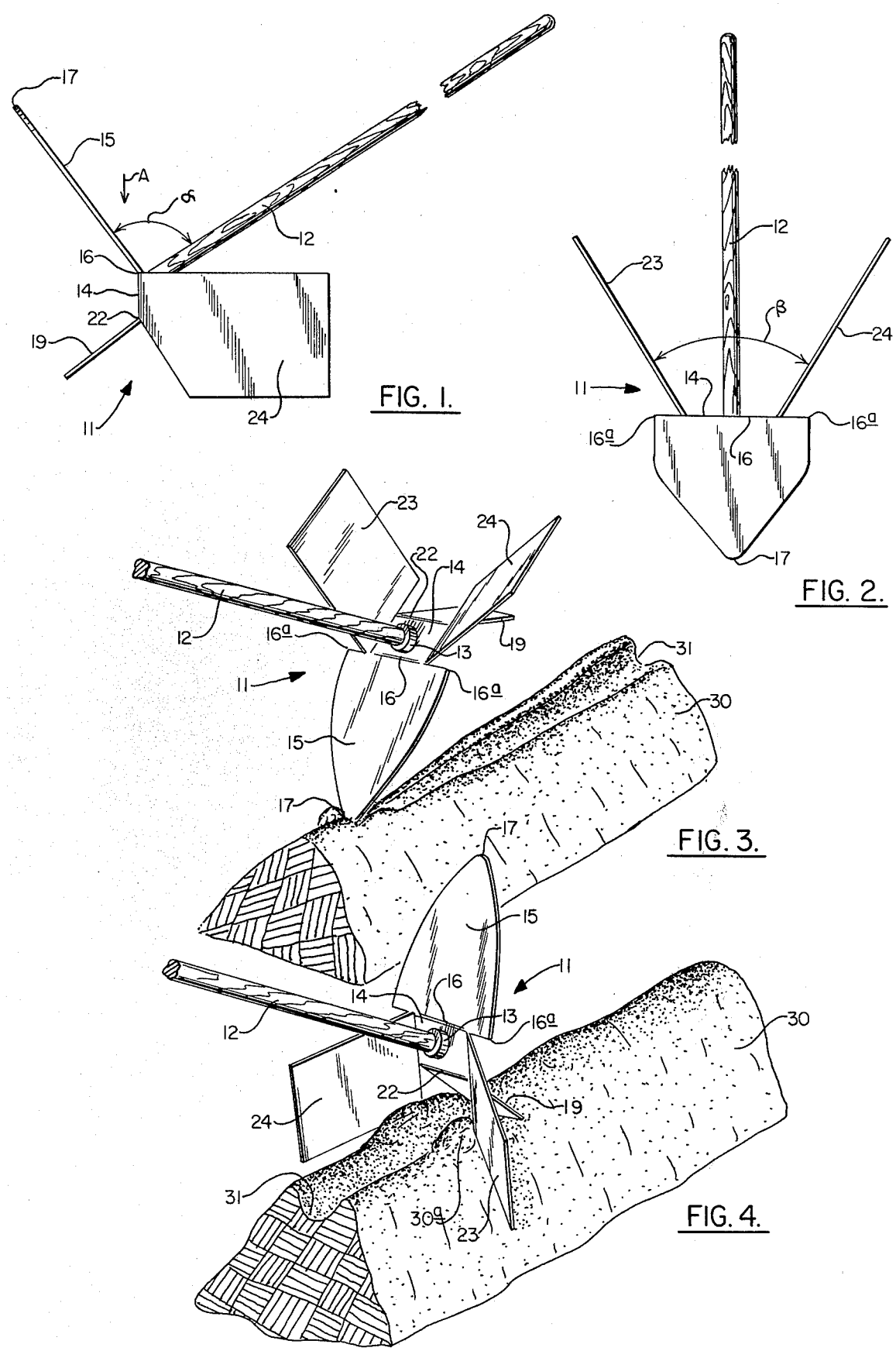
FIG. 1 is a side elevational view of the tool in the trench-covering position.
FIG. 2 is a plan view taken along the direction of arrow "A" of FIG. 1.
FIG. 3 is a perspective view of the tool being used to dig a trench in a row for the implantation of seeds; and, FIG. 4 is a perspective view of the tool being used to cover the trench into which seeds have been implanted.

Referring to the drawings wherein like reference characters designate corresponding parts throughout the several figures, the garden tool or implement, as contemplated in the present invention, is generally shown by the numeral 11. The implement 11 comprises a handle 12 by which the user may properly operate the invention in its various modes. The handle 12 is preferably fitted into a cylindrical handle receiving member 13 which is attached to the implement body. The implement body generally comprises a flat central plate member 14 whose overall configuration is rectangular. Handle 12 is mounted on the front of plate 14.

The handle receiving member 13 may be attached to the central plate 14 in any desired manner. It may be welded to the central plate or it may be bolted thereto.

Depending from the lower-most edge of the central plate 14 is a trench digging blade 15 which, at its uppermost portion, is attached to the central plate 14 at first bend line 16 and then extends outwardly from bend line 16 to edge 16a from where it tapers down to point 17. Digging blade 15 is preferably bent at bend line 16 to a point where it is approximately perpendicular to handle 12. Thus, the angle α shown in FIG. 1 which is the angle between the digging blade 15 and handle 12, is preferably approximately 90 degrees. However, angle α may vary from about 75 degrees to about 100 degrees.

Furthermore, if desired, digging blade 15 at the point at which it is connected to central plate 16 could be varied in width if desired. For example, the upper end of digging blade 15 could be the same width as the length of bend line 16.

At the opposite end of central plate 14 from blade 15 projecting upwardly and in a manner generally parallel to handle 12 is a closing or covering blade 19 which is of rectangular configuration. At the junction point of blade 19 with central plate 15 is a second bend line 22 along which the blade 19 is bent rearwardly from central plate 14. Plate 19 is approximately parallel to handle 12. As can be readily observed, blade 19 forms a middle rake blade with two other blades which will be subsequently described herein. With the other two blades the present invention then becomes a three-bladed trench-covering apparatus.

On the two remaining edges of the central plate 14 are attached a pair of elongated blades 23 and 24. These two rake blades are attached to the central plate 14 at the remaining side edges thereof and the blades project frontwardly of the central plate toward the handle 12 in such a manner that they diverge from one another so that they include an angle β therebetween. The angle β may vary from about 100 degrees to about 50 degrees. Preferably, angle β varies from about 85 degrees to about 65 degrees.

Each of the rake blades 23 and 24 are of an elongated shape and of generally rectangular configuration consistent with the needs to which they are put. Therefore, in conjunction with rake blade 19 the two rake blades 23 and 24 form a trench-covering apparatus which can best be seen in FIG. 2.

To use the garden implement of the invention to dig a row as shown in FIG. 3, the implement is positioned so that blade 15 is pointed downwardly to enable point 17 of blade 15 to contact the top of row 30 to dig a trench 31 therein for the implantation of seeds. After the seeds are placed in trench 31, the garden implement is rotated 180 degrees as shown in FIG. 4 and is pulled toward the holder. As can be seen in FIG. 4, blades 23 and 24 strike the dirt 30a on the edges of trench 31 to force it toward the inside of trench 31 after which blade 19 further smoothes the dirt over the top of row 30 to completely and uniformly cover the seed row.

Thus, it can be seen that seed rows may be rapidly dug with blade 15 and seeds may be placed in trench 31. Then the trenches may be rapidly covered by rotating the garden implement to the position shown in FIG. 4.

Various modifications may be made in the invention without departing from the spirit and scope thereof. It is desired, therefore, that only such limitations shall be placed thereon as are imposed by the prior art and as set forth in the appended claims.

What is claimed:

1. A hand-held garden implement adapted to dig a trench for a seed row and cover the trench having an elongated handle comprising:
   a. a central plate portion to which said handle is affixed, said central plate portion having a forward side and a rearward side and being generally rectangular in shape with four edges, the forward and rearward sides further defining corresponding forward and rearward directions pointing away from the respective sides of the central plate;
   b. a handle-receiving member centrally attached to the forward side of said central plate, said handle-receiving member being of cylindrical configuration, said handle being received in said handle-receiving member and projecting in the forward direction away from said central plate;

c. a tapered triangular digging blade for digging a trench for seeds in a row formed of dirt integral with said central plate and depending from one of said edges thereof, said one edge at the junction of the digging blade and central plate comprising a first bend line, said digging blade terminating in a point, and wherein said digging blade forms an angle of from about 75 degrees to about 100 degrees with the longitudinal axis of the handle, the tapered digging blade generally being flat from said first bend at the junction of said blade and said central plate to said point;

d. first and second rake blades projecting in the forward direction with respect to said central plate, said rake blades projecting from two additional ones of said edges of said central plate, which additional edges are opposite each other, said rake blades projecting from the flat central plate at a diverging angle bisected by said handle wherein the included angle between the diverging blades varies from about 50 to about 100 degrees, said first and second rake blades being so shaped and oriented with respect to each other that said rake blades are positioned to force dirt from the sides of said trench to fill said trench, said rake blades being of substantially rectangular configuration; and e. a third rectangular rake blade smaller than said first and second blades for smoothing said dirt over said trench projecting from that one of said edges of the said central plate that is opposite to the edge to which said tapered blade is attached, said that edge at the junction of the third rake blade and the central plate comprising a third bend line, the third rake blade being affixed to that edge of said flat central plate at the third bend line along which the third rake blade is bent in the rearward direction with respect to said central plate generally paralled to said handle, said third blade being so oriented and proportioned relative to said first and second blades as to act in conjunction therewith so that as said first and second blades force dirt from the sides of said trench to fill the same, said third blade is positioned to smooth said dirt over the trench.

2. The implement of claim 1 wherein said central plate is flat.

3. The implement of claim 1 wherein said digging blade is substantially perpendicular to the longitudinal axis of the handle.

* * * * *